(12) United States Patent
Glowaski

(10) Patent No.: US 6,631,590 B1
(45) Date of Patent: Oct. 14, 2003

(54) ERECTABLE SHELTER

(76) Inventor: Shannon Glowaski, 166 Tuscany Ridge Close NW, Calgary, Alberta (CA)

( * ) Notice: Subject to any disclaimer, the term of this patent is extended or adjusted under 35 U.S.C. 154(b) by 0 days.

(21) Appl. No.: 10/170,045

(22) Filed: Jun. 11, 2002

(51) Int. Cl.$^7$ .............................................. E04H 15/18
(52) U.S. Cl. ............................ 52/63; 135/87; 135/160; 135/436; 446/478
(58) Field of Search ........................ 52/63, DIG. 13; 135/87, 158, 160; 446/476, 8, 105, 115, 478, 109, 116, 108; 43/58; 119/436

(56) References Cited

U.S. PATENT DOCUMENTS

| | | | |
|---|---|---|---|
| 2,793,401 A | 5/1957 | Paschke | |
| 3,132,443 A | 5/1964 | Kuhn | |
| 3,234,907 A | 2/1966 | Palencia | |
| 3,478,722 A | 11/1969 | Falcone et al. | |
| 4,256,056 A | 3/1981 | Sou | |
| 4,387,533 A | * 6/1983 | Green et al. | 47/17 |
| 4,576,116 A | 3/1986 | Binkert | |
| 4,685,728 A | * 8/1987 | Rebollo | 297/184.14 |
| 4,792,082 A | 12/1988 | Williamson | |
| 4,869,206 A | 9/1989 | Spina | |
| 4,903,637 A | 2/1990 | Devault | |
| 5,014,649 A | 5/1991 | Taft | |
| 5,033,493 A | * 7/1991 | Senchuck | 135/149 |
| 5,078,096 A | 1/1992 | Bishop et al. | |
| 5,121,710 A | 6/1992 | Gonzalez | |
| 5,335,618 A | 8/1994 | Zarola | |
| 5,452,681 A | 9/1995 | Ho | |
| 5,465,686 A | 11/1995 | Monetti et al. | |
| 5,482,490 A | * 1/1996 | Weldon-Ming | 446/75 |
| 5,522,344 A | 6/1996 | Demurjian | |
| 5,564,454 A | 10/1996 | Curley et al. | |
| 5,626,098 A | 5/1997 | Askins et al. | |
| 5,669,331 A | 9/1997 | Richmond | |
| 5,752,470 A | 5/1998 | Koneke | |
| 5,769,028 A | 6/1998 | Deckys | |
| 5,813,169 A | * 9/1998 | Engerman | 47/17 |
| D404,092 S | * 1/1999 | Stader | 446/476 |
| 5,950,568 A | 9/1999 | Axelrod et al. | |
| 6,260,308 B1 | * 7/2001 | Looney | 52/63 |

OTHER PUBLICATIONS

US 5,725,502, 3/1998, Askins et al. (withdrawn)

\* cited by examiner

*Primary Examiner*—Carl D. Friedman
*Assistant Examiner*—Nahid Amiri
(74) *Attorney, Agent, or Firm*—Gene Scott-Patent Law & Venture Group

(57) ABSTRACT

A shelter apparatus comprises an open box base member having a bottom panel and a peripheral, box side wall. A front and a rear shelter walls are removeably engaged in spaced apart vertical slots on the inside of the box side wall. A tension beam is engaged with, and extends between the front and rear shelter walls for rigidity. A fabric cover is extensive between opposing portions of the box side wall and is draped over and supported by the shelter walls. The fabric cover is joined with the front and rear shelter walls and the box side wall by a surface fastening means so that the box side wall, the front and rear shelter walls and the fabric cover enclose a space for a pet. The same elements may be stored within the box base member and secured by the tension beam.

7 Claims, 2 Drawing Sheets

ERECTABLE SHELTER

BACKGROUND OF THE INVENTION

INCORPORATION BY REFERENCE: Applicant(s) hereby incorporate herein by reference, any and all U.S. patents, U.S. patent applications, and other documents and printed matter cited or referred to in this application.

1. Field of the Invention:

This invention relates generally to portable pet shelters and pet houses, and more particularly to portable folding pet shelter of simple and light weight construction.

2. Description of Related Art:

The following art defines the present state of this field:

Paschke, U.S. Pat. No. 2,793,401 describes a small building construction comprising, a rectangular base wall having an upstanding peripheral flange secured thereabout, a plurality of upstanding paneled side walls each having a bottom edge supported in mating relation upon said upstanding peripheral flange and each having a depending marginal rail lying in laterally offset relation with respect to the bottom edge, said rail abutting laterally the upstanding peripheral flange, each of said side walls further having a top edge and a pair of side edges and being releasably connected to a side edge of another side wall, a roof panel interlockably connected to the top edges of the respective side walls, and cooperative fastening means formed laterally on opposed abutting portions of said upstanding peripheral flange and each of the marginal rails, whereby in the disassembly of said building construction said roof may be removed from its interlocking connection with the top edges of the side walls and each of the walls then rocked on its bottom edge to separate its rail from the abutting peripheral flange and thereby to disengage the cooperative fastening means and to release the side edge connection.

Kuhn, U.S. Pat. No. 3,132,443 describes a beam and column construction for a building toy comprising, a vertical column, a longitudinally extending lug projecting from the lower end thereof and a lug receiving socket recessed in the upper end thereof, a longitudinally extending projection disposed at each corner of said upper end and spaced from each other, each projection forming with its adjacent projection a tenon receiving mortise, and a beam having on at least one end thereof a tenon lodged in said mortise, said socket having vertically extending walls, the end surface of said tenon, when lodged in said mortise, forming one wall of an extension of said socket.

Palencia, U.S. Pat. No. 3,234,907 describes an animal cage comprising in combination; a plurality of substantially vertically disposed lateral wall sections with the opposite ends of each of said wall sections being in juxtaposition with an end of an adjacent wall section and forming at least two pairs of ends in juxtaposition, a slidable clip fastener disposed outwardly of said wall sections in removable slidable engagement with each said pair of ends in juxtaposition and normally holding said wall sections in assembled relationship, one of said slidable clip fasteners forming a hinged connection between one of said pair of ends in juxtaposition, a pair of ends spaced from said hinged connection being movable into laterally spaced relationship when one of said slidable clip fasteners is slidably disengaged from said pair of ends, each of said wall sections having at the lower edge thereof a marginal flange extending inwardly in a plane substantially perpendicular to the vertical plane of each said wall sections and providing a transverse supporting surface for engaging the lower surface of a floor member, and a floor member freely supported between said wall sections by said flanges; whereby said floor member is readily removable from said wall sections when said wall sections are moved into laterally spaced relationship after slidably removing one of said slidable clip fasteners from engagement with said wall sections.

Falcone et al., U.S. Pat. No. 3,478,722 describes a bird house comprising an apartment of quadrangular form having a bottom wall, opposite side walls, and a rear wall, certain of said walls being joined together by an integral hinged joint, said side walls being formed with projections extending upwardly from the upper edges thereof, said bottom wall being formed with apertures spaced complemental to said projections said side wall projections on a first apartment entering the apertures in the bottom wall of similar apartment superimposed on said first apartment, said projections serving to interlock said apartments arranged in vertical stack formation, and means cooperable with said side and end walls for detachably connecting apartments together in spaced lateral relation to form a multiple apartment dwelling.

Sou, U.S. Pat. No. 4,256,056 describes a portable case, into which the pet fancier puts his small animal and carries it about, wherein the main body of the case is constructed by putting together a pair of side wall boards, a top board connected at its left and right sides to the respective upper end faces of the left and right side wall boards through the aid of hinged joints, and a bottom board connected at its left and right sides to the respective lower end faces of the left and right side wall boards likewise as above through the aid of hinged joints, which main body of the case is furnished at its front and rear sides with the respective on-off door leaves, and the case thus constructed can be simply folded up by opening both the door leaves.

Binkert, U.S. Pat. No. 4,576,116 describes a collapsible A-frame house providing a common site for a cat to rest, exercise and play comprised of a roof of carpet-like material including two integral roof panels with their bottom edges connected to opposing edges of a floor panel also of carpet-like material. Stiffening panels are affixed onto the backside of the roof panels. A cord has two ends slidably passing through the peak into the house, with cat amusement objects connected to each end. The cord additionally provides a manual handle for lifting the house.

Williamson, U.S. Pat. No. 4,792,082 describes a litter box including an outer front sidewall, an outer rear sidewall, an outer left sidewall, a cover member, and an outer right sidewall. The litter box is formed from a single integral cardboard sheet which, when folded in an appropriate fashion, results in an enclosed, disposable litterbox. The box may be shipped with a supply of litter enclosed, and may be shipped and stored in a rectangular package of approximately 2 inches in height.

Spina, U.S. Pat. No. 4,869,206 describes an animal cage for permitting collection of solid and liquid animal wastes for analysis. The cage comprises a top, bottom and four sides connected together to define an enclosure, a first floor positioned above the bottom. The first floor has a slope along its full dimension to a single lowest point. A second floor supports an animal and positioned above the first floor. The floor includes perforations for permitting liquid waste to pass therethrough onto the sloped first floor while retaining solid wastes thereon and a litter holder for providing a location for instinctive animal elimination of solid and liquid wastes. The litter holder communicates with the perforations for permitting liquid to pass from the litter holder through the second floor onto the first floor. A liquid collector cooperates with the first floor at its lowest point for permitting collection of liquid flowing there.

Devault, U.S. Pat. No. 4,903,637 describes a container, to house or carry small household pets that may be quickly and manually formed between an erected use mode and a flat folded storage mode. The container is of gable roofed house configuration in its erected mode and comprises an interconnected structure formed by hingeably related rigid planar elements that occupy a relatively small volume in the folded storage mode. Handles carried by the roof provide aid in manual carriage, releasable fasteners maintain either erected or storage mode, and an end wall provides a selectively latchable door.

Taft, U.S. Pat. No. 5,014,649 describes a pasteboard cat litter structure comprising a shallow, rectangular, plastic-lined, box-like base adapted for holding a quantity of cat litter. Attached to the top of the base is a collapsible enclosure shaped like a house. The enclosure comprises first and second opposite end panels which fold downwardly and inwardly along a lower crease line to lie flat atop the base when the enclosure is collapsed. The enclosure further comprises a continuous, central portion made up of first and second side panels and an enclosure roof. The central portion is constructed having two (2) opposing, longitudinal, side creases and a roof crest crease, which permit the central portion to be folded down, bellows-style, on top of the folded-down end panels. A flat, substantially closed structure, about the height of the base is then formed. A lid, similar in shape to the base is provided for covering he folded-down enclosure and base, the base fitting downwardly into the lid when the enclosure is erected. A partial cut-out in one side panel hinges outwardly or inwardly about a vertical crease to form an entrance into the enclosure when the enclosure is erected. The cat litter structure can be reused or the enclosure can be collapsed and the lid installed so the entire structure can be disposed of with used litter inside.

Bishop et al., U.S. Pat. No. 5,078,096 describes a somewhat curvilinear, four-sided pyramidal container is disclosed for housing and carriage of small household pets. The container provides a flexible fabric cover which defines optionally coverable mesh windows and an optionally coverable openable access door structure. The container carries a rigid bottom insert and is supported by a rod frame having a square, releasably interconnected bottom element formed of four interconnected semi-rigid rods and two arched, resiliently deformable support rods extending upwardly between opposed corners of the structure, all said rods carried in loops defined on the inner surface of the cover. The support rods are selectively removable to allow assembly and collapse of the structure for storage.

Gonzalez, U.S. Pat. No. 5,121,710 describes a collapsible doghouse, to be used indoors or outdoors, to provide a comfortable and easy to clean place for a dog to rest or seek shade. The doghouse includes elongate side walls, a pair of distal walls, one of which includes an arched entranceway and another of which includes a cutout drainage slot, a roof portion, and a weightable base portion, all of which are securely, yet easily removably connected, and are formed of a substantially solid, yet flexible, water repellant plastic which will facilitate easy cleaning and drainage, and lightweight transportation.

Zarola, U.S. Pat. No. 5,335,618 describes a collapsible animal enclosure has a house unit with spaced sidewalls and a roof of pliable material, and opposite ends forming an enclosed area for housing an animal. Support bows extend transversely across the sidewalls and roof for holding the sidewalls and roof in an open, spread apart condition. The house unit can be collapsed between a fully erect condition in which the opposite ends are spread a maximum distance apart and a collapsed condition in which the ends are pushed inwardly towards one another, collapsing the pliable material between the ends in an accordion-folded manner. An extended run unit of similar construction to the house unit is releasably securable to one end of the house unit to provide an extended exercise area.

Ho, U.S. Pat. No. 5,452,681 describes an animal house including a cap, a base, four posts and four walls secured together. Both the cap and the base include a groove formed in the inner peripheral portion, and the posts each includes two slots for engaging with the edges of the walls so as to solidly secure the walls in place. Four nuts are engaged in both tile base and the cap for engaging with bolts of the posts. The nuts of tile base include a convex bottom portion for engaging with a concave upper portion of the nuts of the cap such that the animal houses may be stably superposed with each other. The animal house may be folded to a compact configuration.

Monetti et al., U.S. Pat. No. 5,465,686 describes a disposable, collapsible pet house foldable from a unitary blank of material received in a flat state, the house being foldable from the blank between a collapsed state for shipping, storage and disposal and an enclosed, erect state for use, the house comprising a container portion having a bottom, a pair of oppositely opposed sidewalls extending upwardly from and integral with the bottom, and a pair of oppositely opposed end walls extending upwardly from and integral with the bottom, the pair of end walls being connected to the pair of sidewalls; a pair of sidewall panels, each integral with a different one of a pair of sidewalls; a pair of end wall panels, each integral with a different one of a pair of end walls, at least one of the pair of end wall panels having an opening therein for ingress and egress of a pet when the house is in the erect state; a pair of roof panels, each integral with a different one of the pair of sidewall panels, one of the pair of roof panels overlapping a portion of the other of the pair of roof panels when the house is in the erect state; and a releasable arrangement associated with each of the pair of roof panels and the pair of end wall panels to interconnect the same to provide the house with stability in the erect state; the pair of end wall panels and the other of the pair of roof panels and its associated one of the pair of sidewall panels being foldable into the container portion and the one of the pair of roof panels and its associated one of the pair of sidewall panels being foldable to cover the pair of end wall panels and the other of the pair of roof panels and its associated one of the pair of sidewall panels and extending over one of the pair of sidewalls and a portion of the bottom to be in an interlocking relation with the bottom when in the collapsed state.

Demutjian, U.S. Pat. No. 5,522,344 describes a pet cage capable of ready disassembly and erection for mounting within a window having a bottom rail and a stop, and projecting beyond the window opening. The pet cage consists of a 5-sided enclosure, including a hollow panel. An accordion-pleated panel assembly is removably connected to the enclosure for adjustably extending between the enclosure and the window stop. Upon disassembly, the panel assembly is removed from the enclosure and stored within the hollow panel so that the disassembled pet cage forms a single, compact, portable structure.

Curly et al., U.S. Pat. No. 5,564,454 describes a collapsible structure having front and back ends with front and back support members including a single central support member to pass in a direct line along the cover means and thus support the entire structure at roughly the center of the cover means. The item may be sewn and easily manufactured in a fashion so that upon being collapsed it occupies the smallest possible volume and has no overlapping support members. Finally in pet toy applications crinkly material and washable material may be included.

Ashkins et al., U.S. Pat. No. 5,626,098 describes a collapsible cage for dogs or rabbits having a rectangular base, fold-down end walls folding sidewalls and a roof. The walls and roof are made of metal grids. The end walls fold down onto the base one over the other. The sidewalls fold in the middle concertina-wise and are hinged at the top to opposite edges of the roof allowing the sidewalls and roof to collapse onto the base over the end walls. The base has a pull out tray or pan and an access door is provided in one of the end walls. Releasable clips are provided to hold the walls and roof together in an elevated position of the structure.

Richmond, U.S. Pat. No. 5,669,331 describes a pet housing expansible to hold a pet and collapsible to suitcase size for manual transport including a pair of platforms and first and second pairs of spaced walls. The walls in the first pair (e.g. front and rear walls) are pivotably attached at opposite ends to the platforms and are hinged at intermediate positions for collapse and expansion. The walls in the second pair (e.g. side walls) are pivotable toward an individual one of the platforms with the platform as a fulcrum to collapse the housing and toward the other platform to expand the housing. In the collapsed housing disposition, detents on opposite sides of the hinge on the first pair of walls releasably engage to maintain the housing collapsed A manually grippable handle on one of the platforms provides for a transport of the collapsed housing. With the walls in the first pair expanded, detents on the walls in the first and second pairs of housings releasably engage to maintain the expanded housing enclosure. A second handle on one of the platforms is manually grippable to provide for the housing transport in the expanded relationship. Third detents provide fm a releasable closing and opening, preferably on a vertical axis, of a door in one of the second pair of walls. The walls in the first and second pairs are preferably ford from gratings of spaced wires to minimize weight and to provide a circulation of air through the housing from the atmosphere in the expanded housing.

Ashkins, et al., U.S. Pat. No. 5,727,502 describes a collapsible pet home having a base, side walls, end walls and a roof can be converted into an exercise pen for the pet by folding the end walls down onto the base, setting the base on end and using the base, side walls and roof to form peripheral walls of the exercise pen. An additional pen-forming module is provided to connect with the roof one side and one of the sidewalls on the other side to complete the peripheral wall of the exercise pen. The base may have a compartment for storing the additional module when it is not in use. The entire structure folds down into a compact package.

Koneke, U.S. Pat. No. 5,752,470 describes a collapsible system that can also be used for potable pet houses most types of small free standing buildings, as well as for emergency housing in times of disasters. The collapsible structure is better than a tent because it has real walls, a roof and has the feel of a home. The system can also be used for permanent housing, is depending on building codes and types of materials used by making the structure portable, it is easy to move from place to place. It can also cut down on cost of moving large and bulky objects, and also can cut down on packaging material. In the case of the housing, it cuts down on the cost of shipping. The record time that it takes to put up a collapsible structure also cuts down on manpower needed to set it up, thereby increasing quality control, because the collapsible structure can be made in a controlled factory environment and one can ship considerably more than what one could normally ship.

Deckys, U.S. Pat. No. 5,769,028 describes a carrier including a main unit and an insert unit. The main unit defines a carrying space having a closed bottom and four sides, one of which has an opening therethrough large enough to permit an animal to enter the space through the opening. The insert unit has a closed top, four sides, and an open bottom. After the animal has entered the main unit, the insert unit is lowered down into the main unit to close off the side opening. Then a foldable top closure for the main unit is folded to secure the carrier and form a handle structure for carrying the carrier. Both units are foldable and are structured to provide an enhanced strength carrier. Strength enhancing features include the foldable bottom of the main unit, double and triple thickness portions of the top closure, and the presence of the insert unit in the main unit.

Axelrod et al., U.S. Pat. No. 5,950,568 describes a collapsible/foldable structure comprising a top roof and a bottom platform defining a top and bottom of the structure and a front and rear collapsible wall each pivotally attached to the bottom platform to provide for pivotable collapse of the front and rear walls. The structure further contains a pair of sidewalls each pivotally attached to the roof to facilitate inward collapse of said sidewalls when said sidewalls are pivoted toward the bottom platform. The sidewalls further contain an upper, middle and lower section, wherein the upper and middle sections are pivotally attached to one another and the middle and lower section are also pivotally attached to one another so that the upper and middle sidewall sections can be pivoted inwardly towards the bottom platform. Furthermore, the top roof section further comprises two roof sections pivotally attached to one another at about the mid-point of the roof section, so that the two roof sections can collapse downwardly along the pivotable attachment toward the bottom platform. The collapsible/foldable structure herein is particularly useful as a shelter for domestic pets and other small animals.

The prior art teaches a wide range of pet shelters but does not teach a shelter that disassembles into a box base member which is used as a structural element for supporting the shelter. The present invention fulfills these needs and provides further related advantages as described in the following summary.

SUMMARY OF THE INVENTION

The present invention teaches certain benefits in construction and use which give rise to the objectives described below.

A shelter apparatus comprises an open box base member having a bottom panel and a peripheral, box side wall. A front and a rear shelter walls are removeably engaged in spaced apart vertical slots on the inside of the box side wall. A tension beam is engaged with, and extends between the front and rear shelter walls for rigidity. A fabric cover is extensive between opposing portions of the box side wall and is draped over and supported by the front and rear shelter walls and the box side wall by a surface fastening means so that the box side wall, the front and rear shelter walls and the fabric cover enclose a space for a pet. The same elements may be stored within the box base member and secured by the tension beam.

A primary objective of the present invention is to provide an apparatus and method of use of such apparatus that provides advantages not taught by the prior art.

Another objective is to provide such an invention capable of light weight construction.

A further objective is to provide such an invention capable of compact storage and quick and easy erection.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
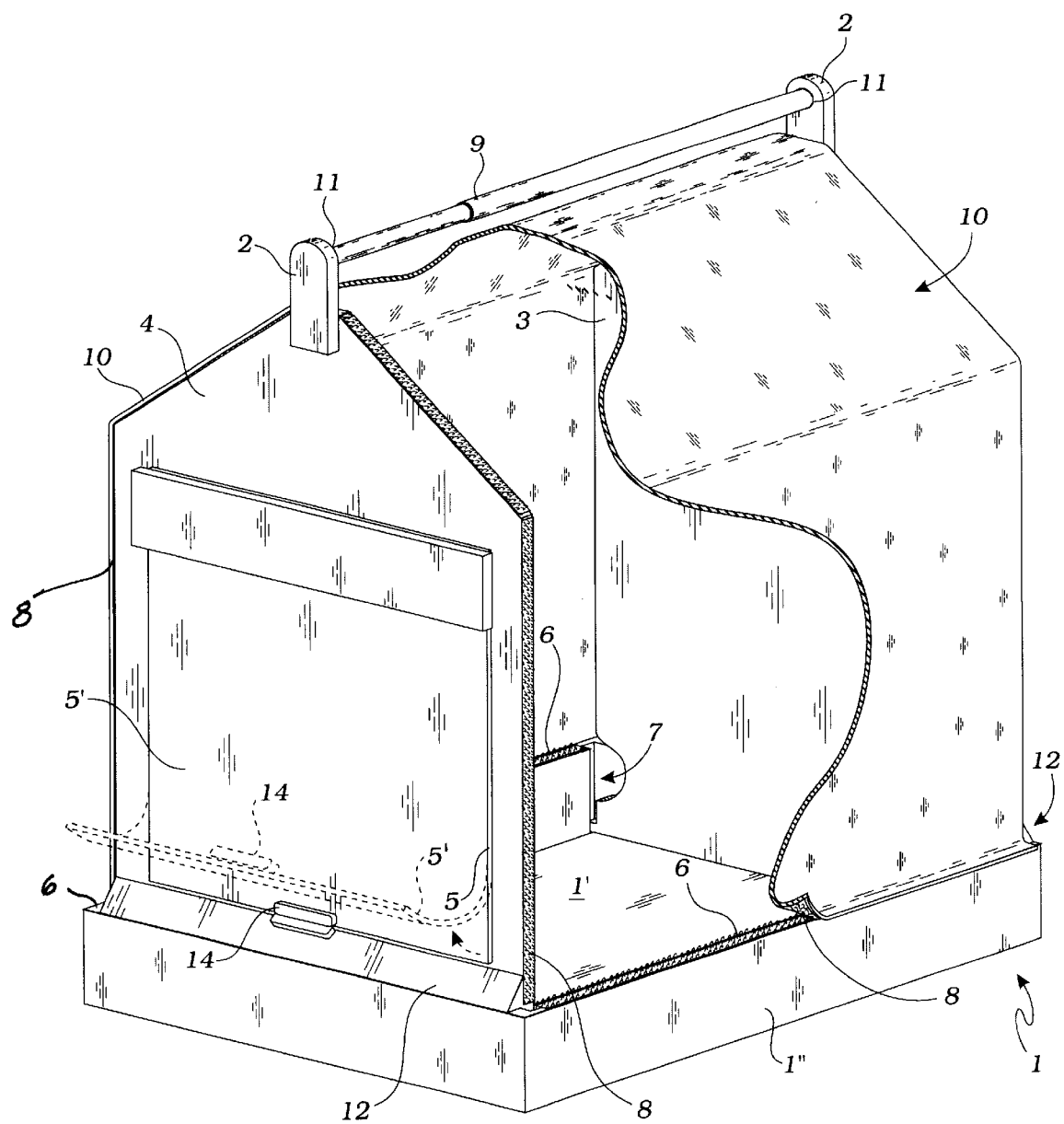
FIG. 1 is a perspective view of the preferred embodiment of the invention as erected.

The present invention is a shelter apparatus comprising an open box base member 1 having a bottom panel 1' and, extending upward therefrom, an integral, peripheral, box side wall 1" as shown in FIG. 1. This construction may be made of wood or plastic or other common rigid structural materials. A front 4 and a rear 3 rigid shelter walls are removeably engaged in spaced apart vertical slots 7 in the box side wall 1". The walls 4, 3, are configured to slide into the slots 7 with frictional engagement so that the walls are not easily pulled out of the slots 7. An extensible beam 9, may be a spring tension type or a threaded extensive beam, both of which are well known. Beam 9 is engaged with, and extensive between the front and rear shelter walls 4, 3 and engages recesses 11 in these walls as shown in FIG. 1. The beam 9 and recesses 11 may be threaded so that beam 9 may be threadedly engagable with recesses 11 for improved structural rigidity. Preferably beam 9 is made up of plural collinear segments in a telescoping, spring biased relationship. Vertical extension pieces 2, shown in FIG. 1 are mounted and engaged with walls 4, 3 to provide an improved structural reception of beam 9 above the contiguous walls 4, 3.

A flexible fabric cover 10 is extensive between opposing portions of the box side wall 1" and is draped, as shown in FIG. 1, over the front and rear sidewalls 4, 3. The fabric cover 10 may be made of any material that is typically used for tents and the like, such as canvas or woven nylon, and is joined with the front and rear shelter walls 4, 3, and with the box side wall 1" by a surface fastening means 8 such as Velcro®, so that the box side wall 1", the front and rear shelter walls 4, 3, and the fabric cover 10 enclose a space for a pet such as a dog or cat. As shown, the surface fastening means 8 comprises thin strips laid along edges of the several elements described above. Preferably, the front and rear shelter walls 4, 3, have an integral base portion 12, or sill, that rests in contact with an upwardly facing edge 6 of the box side wall 1". This provides a footing for the shelter walls so that they are rigidly upright in light of the bias pressure exerted by the beam 9. The upwardly facing edge 6 is peripheral about the box side wall 1" and along each side, maintains the surface fastening means 8 for engaging fabric cover 10, as is clearly shown in FIG. 1.

Figure 2:
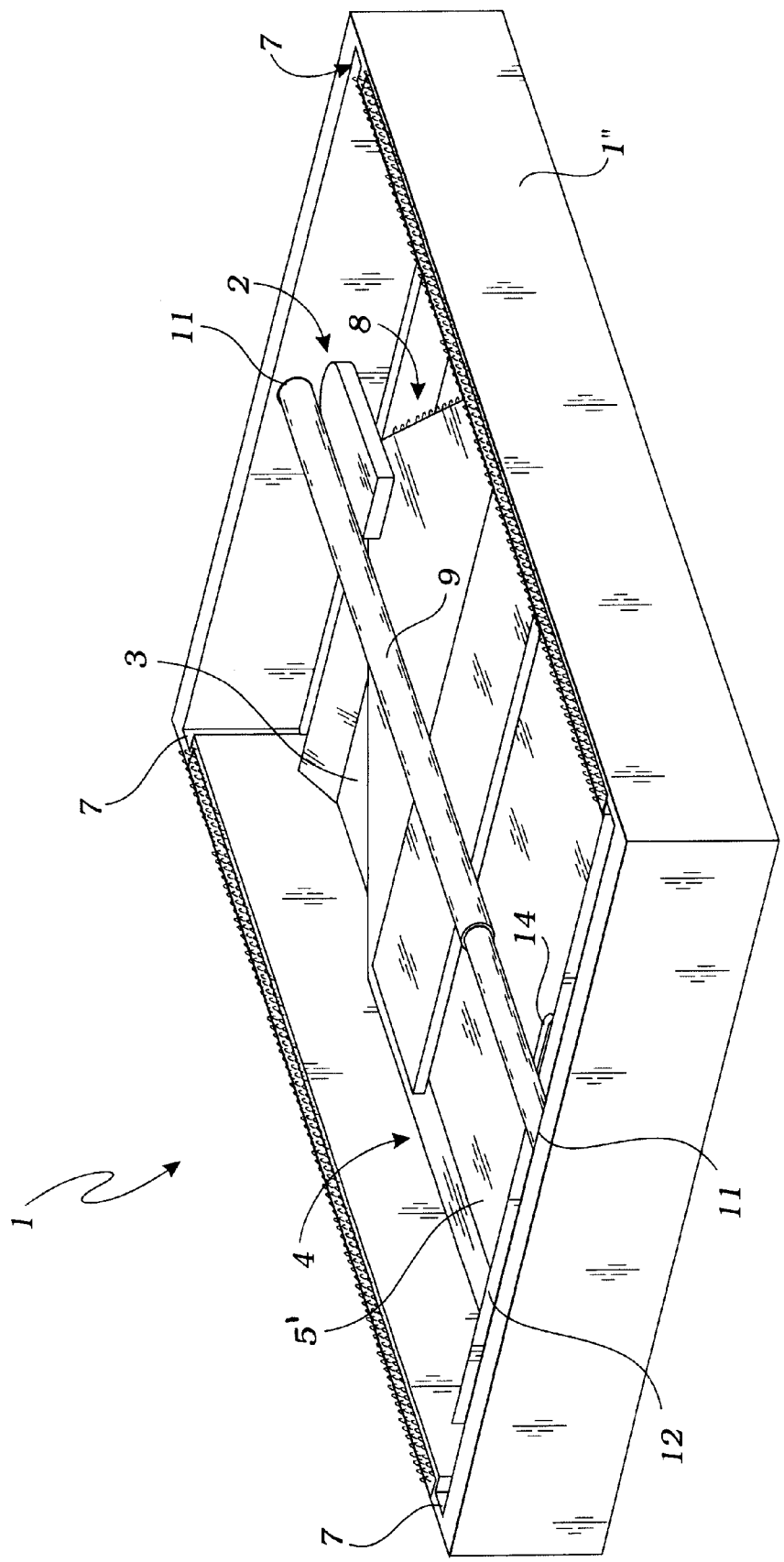
FIG. 2 is a perspective view thereof disassembled for storage.

As shown in FIG. 2, the peripheral box side wall 1" accepts the front and rear shelter walls 4, 3, stacked on top of the bottom panel 1' of the box base member 1 when the shelter is not in use or is being transported. The box side wall 1" includes a pair of the opposing recesses 11 wherein the beam 9 may be engaged for securing the front and rear shelter walls 4, 3, and the fabric cover 10 between the beam 9 and the bottom panel 1' within the box base member 1'.

Preferably, at least one of the front and rear shelter walls 4, 3, provides a doorway aperture 5 for access by a pet to the interior of the shelter. A flexible cover 5' is engaged over the doorway aperture 5 along the top portions of the aperture 5 and the cover 5' so that the flexible cover 5' is enabled for swinging into and out of the enclosed space. This is shown in FIG. 1 with dashed lines where the bottom portion of cover 5' is partially lifted. To accomplish this, the flexible cover 5' is only as wide as the aperture 5, and preferably slightly less wide. Preferably, a magnetic latch 14 is mounted on the sill 12 and on the bottom edge of the cover 5 so as to bias the flexible cover 5 into a vertical, closed attitude. Such bias is easily overcome by an animal moving against the cover 5 so that it does not impede use of this entry access.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A shelter apparatus comprising: an open box base member having a bottom panel and, extending upward therefrom an integral, peripheral, box side wall; a front and a rear shelter walls removeably engaged in spaced apart vertical slots in the box side wall; a beam engaged with, and extensive between the front and rear shelter walls; and a fabric cover extensive between opposing portions of the box side wall and draped over and supported by the front and rear shelter walls and the box side wall by a surface fastening means so that the box side wall, the front and rear shelter walls and the fabric cover enclose a space.

2. The apparatus of claim 1 wherein the peripheral box side wall accepts the front and rear shelter walls stacked on the bottom panel of the box base member for storage therein.

3. The apparatus of claim 1 wherein at least one of the front and rear shelter walls provides a doorway aperture therein.

4. The apparatus of claim 3 further comprising a flexible cover engaged over the doorway aperture, the flexible cover enabled for swinging into and out of the enclosed space.

5. The apparatus of claim 4 further comprising a magnetic latch for biasing the flexible cover in a vertical, closed attitude.

6. The apparatus of claim 1 wherein the beam comprises plural collinear segments in telescoping, spring biased relationship.

7. The apparatus of claim 2 wherein the box side wall includes a pair of opposing depressions; the beam engagable therein for securing the front and rear shelter walls and the fabric cover between the beam and the bottom panel within the box base member.

* * * * *